United States Patent [19]

Reik

[11] Patent Number: 4,496,137
[45] Date of Patent: Jan. 29, 1985

[54] DIAPHRAGM SPRING FOR USE IN FRICTION CLUTCHES AND THE LIKE

[75] Inventor: Wolfgang Reik, Bühl, Fed. Rep. of Germany

[73] Assignee: Luk Lamellen und Kupplungsbau GmbH, Bühl, Fed. Rep. of Germany

[21] Appl. No.: 396,805

[22] Filed: Jul. 9, 1982

[30] Foreign Application Priority Data

Feb. 10, 1982 [DE] Fed. Rep. of Germany ....... 3204621

[51] Int. Cl.³ .......................... F16D 13/44; F16F 1/34
[52] U.S. Cl. .................................... 267/161; 267/181; 192/70.27; 192/89 B
[58] Field of Search ............... 192/70.27, 70.29, 70.30, 192/89 B, 99 S; 267/161, 162, 163, 181

[56] References Cited

U.S. PATENT DOCUMENTS

| | | | |
|---|---|---|---|
| 2,634,123 | 4/1953 | Ralston | 267/162 |
| 2,706,491 | 4/1955 | Kohler | 192/89 B |
| 2,725,964 | 12/1955 | Maurer | 192/89 B |
| 3,237,739 | 3/1966 | Prttchard | 192/89 B |
| 4,241,819 | 12/1980 | Babcock et al. | 192/70.27 |

FOREIGN PATENT DOCUMENTS

| | | |
|---|---|---|
| 1103690 | 3/1961 | Fed. Rep. of Germany . |
| 1198214 | 8/1965 | Fed. Rep. of Germany .... 192/89 B |
| 2311221 | 1/1977 | France . |

Primary Examiner—Rodney H. Bonck
Assistant Examiner—James J. Merek
Attorney, Agent, or Firm—Peter K. Kontler

[57] ABSTRACT

A diaphragm spring whose outer marginal portion is a circumferentially complete annulus and whose inner marginal portion surrounds a centrally located opening and is formed with a set of radially extending prongs directly surrounding the opening and separated from each other by relatively short radially extending inner slots. The inner marginal portion is further formed with relatively long radially extending outer slots each of which is spaced apart from and registers with one of the inner slots and has an enlarged outer end portion inwardly adjacent to the outer marginal portion. Still further, the inner marginal portion has radially extending elongated closed slots which alternate with pairs of aligned inner and outer slots and each of which partially overlaps the adjacent inner and outer slots.

10 Claims, 2 Drawing Figures

4,496,137

DIAPHRAGM SPRING FOR USE IN FRICTION CLUTCHES AND THE LIKE

BACKGROUND OF THE INVENTION

The present invention relates to diaphragm springs or cup springs of the type wherein a circumferentially complete outer marginal portion or rim surrounds an annulus of fingers or prongs extending toward the centrally located opening of the spring.

German Auslegeschrift No. 1,103,690 discloses a diaphragm spring wherein the prongs are separated from one another by elongated slots having enlarged outermost portions adjacent to the rim. The inner end portions of the prongs are subjected to a separate hardening treatment so that their hardness exceeds that of other parts of the spring. The enlarged portions of the slots can resemble circular or oval openings, or they may have other configurations such as openings which are bounded in part by parallel edge faces, in part by outwardly diverging edge faces and in part by substantially semicircular edge faces. Diaphragm springs of the just outlined type are often utilized in friction clutches wherein the rim of the spring abuts against a pressure plate and the inwardly extending prongs cooperate with a release bearing or an analogous device which effects the engagement or disengagement of the clutch. An intermediate portion of the diaphragm spring in a friction clutch is normally confined between two ring-shaped seats where the spring can pivot during or as a result of axial displacement of the tips of its prongs. The seats engage the respective sides of the diaphragm spring in the region of radially outermost parts of the aforementioned enlargements of slots between the prongs, and the prongs act not unlike levers which cause the spring to pivot between the seats when the condition of the clutch is to be changed.

OBJECTS AND SUMMARY OF THE INVENTION

An object of the invention is to provide a novel and improved diaphragm spring which can store larger quantities of energy than heretofore known diaphragm springs containing the same quantities of material.

Another object of the invention is to provide a diaphragm spring which can store energy in parts that, in conventional diaphragm springs, merely serve as a means for effecting a change in the condition (conicity) of the spring.

A further object of the invention is to provide a novel and improved distribution of slots, cutouts the other forms of voids in a diaphragm spring for use in friction clutches or the like.

An additional object of the invention is to provide a diaphragm spring of lightweight design which can store the same or larger quantities of energy than a conventional diaphragm spring of identical size and weight.

Another object of the invention is to provide a novel and improved method of making a diaphragm spring of the above outlined character.

A further object of the invention is to provide a device, such as a friction clutch, which embodies the improved diaphragm spring.

An additional object of the invention is to provide a novel and improved method of prolonging the useful life of a diaphragm spring.

Another object of the invention is to produce a diaphragm spring with substantial savings in material and in such a way that the spring exhibits characteristics which are not achievable by conventional springs.

A further object of the invention is to provide a diaphragm spring wherein the capacity or ability to store energy is not limited to the outer marginal portion of the spring.

An additional object of the invention is to provide a diaphragm spring wherein elastic energy can be stored in at least two circumferentially complete zones of the spring.

Another object of the invention is to provide a diaphragm spring wherein the inner marginal portion is protected against peak stresses and wherein such inner marginal portion is capable of "breathing" when the spring is in use.

A further object of the invention is to provide the diaphragm spring with novel and improved means for enhancing its capacity to store energy.

The invention resides in the provision of a diaphragm spring having a substantially centrally located and preferably circular opening and comprising a circumferentially complete annular outer marginal portion and a plurality of fingers or prongs disposed inwardly of the outer marginal portion and extending toward the opening. The spring is further provided with elongated first slots disposed between the prongs and with elongated second slots extending toward the opening and disposed between the first slots and the outer marginal portion and having enlarged portions in the region of the outer marginal portion. The first slots are spaced apart from the second slots, as considered in the radial direction of the outer marginal portion, and the spring is further provided with preferably elongated and preferably narrow cutouts overlying portions of the first and portions of the second slots, as considered in the radial direction of the outer marginal portion, and being spaced apart from the opening. The prongs form part of an annular inner marginal portion of the spring which directly surrounded the opening and is formed with the aforementioned slots and cutouts. The width of such inner marginal portion preferably exceeds the width of the outer marginal portion, as considered in the radial direction of the spring.

The free end portions of the prongs preferably immediately surround the opening, i.e., the first slots are open slots which communicate with the opening. The slots and/or the cutouts preferably extend at least substantially radially of the inner and outer marginal portions, and each of the first slots is preferably aligned with a different second slot. The first and second slots, as well as the cutouts, are preferably equidistant from one another, as considered in the circumferential direction of the spring. In other words, the first slots are equidistant from one another, the second slots are equidistant from one another, and the cutouts are also equidistant from one another. The length of the cutouts preferably exceeds the length of the first slots, and the length of the second slots can exceed the length of the first slots.

The novel features which are considered as characteristic of the invention are set forth in particular in the appended claims. The improved diaphragm spring itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
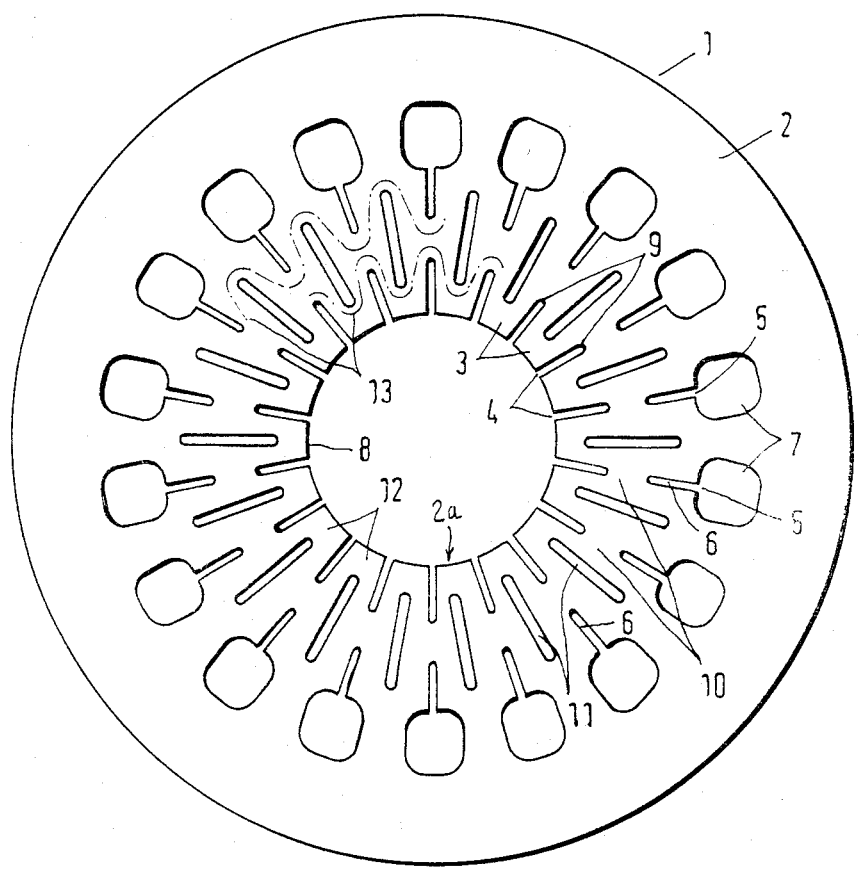
FIG. 1 is an elevational view of a diaphragm spring or cup spring which embodies the present invention.

Referring first to FIG. 1, there is shown a conical washer-like diaphragm spring or cup spring 1 which comprises a circumferentially complete annular outer marginal portion or rim 2 and an interrupped inner marginal portion 2a whose width, as considered in the radial direction of the spring 1, exceeds the width of the rim 2 and which immediately surrounds a centrally located circular opening 8. The inner marginal portion 2a comprises a set of radially extending fingers or prongs 3 whose inner end portions or tips 12 directly surround the opening 8 and which are separated from one another by relatively short radially extending open slots 4. The inner marginal portion 2a is further formed with a set of radially extending relatively long closed slots 5 each of which has a relatively narrow inner portion 6 and an enlarged outer portion 7 adjacent to the rim 2. The portions 6 of the outer slots 5 are aligned with the corresponding inner slots 4, and the combined length of the portions 6, 7 of each outer slot 5 exceeds the length of an inner slot 4. It can be said that each prong 3 is partially bounded by a pair of composite slots each including an inner slot 4 and the aligned radially extending outer slot 5. All of the slots 4 and 5 can be formed by stamping, punching or by resort to any other known mass-producing technique.

Each inner slot 4 is separated from the respective (aligned) outer slot 5 by a bridge or web 10 which can have a width approximating the length of the inner slot 4 and provides a connection between the intermediate portions of neighboring prongs 3. It will be noted that the inner slots 4 are aligned with one another, as considered in the circumferential direction of the spring 1, and the same applies for the outer slots 5. In other words, the radially outermost parts 9 of the slots 4 are located on a circle whose center coincides with the axis of the spring 1, and the radially innermost parts of portions 6 of the slots 5 are located on a circle whose center is also located on such axis. The distance between the periphery of the rim 2 and each of the enlarged portions 7 is the same.

The inner marginal portion 2a of the spring 1 is further formed with an annulus of aligned intermediate slots or cutouts 11 whose length exceeds that of a slot 4 and which partially overlap the adjacent inner slots 4 as well as the adjacent outer slots 5. In other words, each cutout 11 is located between two bridges or webs 10 but is longer than such webs, as considered in the radial direction of the spring 1. The neighboring cutouts 11 are equidistant from one another, as considered in the circumferential direction of the spring 1, and each thereof extends at least substantially radially of the rim 2 and/or inner marginal portion 2a.

As indicated in FIG. 1 by phantom lines at 13, the cutouts 11 and the slots 4 and 5 define two circumferentially complete undulate or meandering zones or regions which constitute additional energy storing portions of the diaphragm spring 1, i.e., they can store energy in addition to the circumferentially complete rim 2. Each of the meandering zones 13 can be said to constitute a ring-shaped tension spring and each of these meandering zones can be flexed relative to the neighboring meandering zone and/or rim 2, as considered in the circumferential direction of the spring 1.

The invention is based on the recognition that, even though a diaphragm spring can store (not only statically but also dynamically) maximum amounts of elastic energy per unit of volume, heretofore known diaphragm springs are far from ideal because the elastic energy can be stored practically exclusively in the circumferentially complete outer marginal portion or rim, namely, in the spring portion which is located radially outwardly of the enlarged outer portions of slots between neighboring prongs. In other words, only a relatively small percentage of the material of the spring is used for such purposes. The simplest mode of enhancing the working capacity or ability of a diaphragm spring is to increase the width of the rim, as considered in the radial direction of the spring, and/or to increase the thickness of the spring. Such technique cannot be resorted to under any and all circumstances where a diaphragm spring is put to use because this would adversely influence the so-called $h_o/s$ ratio wherein $h_o$ is the co-called spring distance which the spring must cover in order to be converted from a hollow frustoconical body into a flat body, and s is the thickness of the spring. An unsatisfactory $h_o/s$ ratio would result in a reduction of useful life of a diaphragm spring, especially of a dynamically stressed diaphragm spring.

The improved diaphragm spring 1 is characterized in that it can generate greater forces without increasing the quantity of material therein, i.e., the spring can store larger quantities of energy or, alternatively, the spring can store the same quantities of energy as a conventional diaphragm spring even though the quantity of its material is a fraction of that in a heretofore known diaphragm spring. Furthermore, the useful life of the improved diaphragm spring is longer than that of conventional springs, and the improved spring can exhibit spring characteristics which cannot be achieved with heretofore known springs. This is accomplished by the simple expedient that the heretofore customary continuous slots between neighboring fingers or prongs of the diaphragm spring are replaced by several slots (such as a slot 4 and the aligned slot 5) which are spaced apart from one another, as considered in the radial direction of the diaphragm spring (i.e., in the longitudinal direction of the prongs), in that the width of the webs or bridges 10 (as considered in the radial direction of the spring 1) is rather pronounced, and by the provision of the elongated cutouts 11 which overlie portions of neighboring inner slots 4 as well as portions of neighboring outer slots 5.

The just discussed design of the improved diaphragm spring 1 ensures that the inner marginal portion 2a (i.e., the portion which is formed with the prongs 3) need not merely perform the function of a lever but can be utilized for storage of additional energy. As explained in connection with FIG. 1, the zones 13 which can store additional energy are those which form a meandering annulus extending along the outer ends 9 of the inner slots 4 and the inner ends of the cutouts 11, as well as those which form an annulus extending along the inner ends of the slots 5 and the outer ends of the cutouts 11. In other words, each of the parts which are capable of storing additional energy includes portions of the webs or bridges 10; one of these parts further includes the material surrounding the inner portions of the cutouts 11; and the other of these parts further includes the material surrounding the outer portions of the cutouts 11. Thus, by the simple expedient of departing from a diaphragm spring design wherein the slots flanking the prongs extend all the way from the central opening to the circumferentially complete rim, one can ensure that the spring portion (2a), which in heretofore known diaphragm springs merely performed the function of a composite lever, is now capable of storing substantial additional quantities of energy when the conicity of the diaphragm spring is changed counter to the direction of its force and by varying the spacing between neighboring prongs 3. Otherwise stated, whenever the conicity of the improved diaphragm spring 1 changes, the material of the circumferentially complete meandering zones 13 shown in FIG. 1 is subjected to stresses with attendant generation of additional tension which results in storage of energy in addition to that stored in the rim 2.

Another important advantage of the improved diaphragm spring 1 is that no additional stressing or tensioning of the rim 2 takes place when the conicity of the spring 1 is changed. This is achieved by the aforediscussed distribution and orientation of various slots and cutouts, as considered in the circumferential direction of the spring, so that the meandering zones or regions 13 can resile independently of one another. In other words, the slots 4, 5 and cutouts 11 ensure that each of the zones 13 can exhibit a certain amount of springiness (as considered in the circumferential direction of the spring) independently of the other zone and independently of the rim 2. Such characteristics of the spring 1 are believed to be attributable to the provision of cutouts 11 which not only enable the individual zones 13 to flex relative to one another and relative to the rim 2 but also allow for flexing of discrete sections of each zone 13 relative to the other section or sections of the same zone. The cutouts 11 and/or portions 6 of the outer slots 5 prevent the development of peak stresses and allow for so-called "breathing" of the inner marginal portion 2a.

As explained above, and as shown in FIG. 1, it is presently preferred to orient the slots 4 and/or 5 and/or cutouts 11 in such a way that they extend at least substantially radially of the spring 1. This has been found to contribute to versatility of the diaphragm spring. The same applies for the presently preferred feature that each inner slot 4 is at least substantially aligned with a different outer slot 5.

Since the novel design of the inner marginal portion 2a enables the latter to store additional energy without causing additional stressing and/or tensioning of the rim 2, the quantity of material which is used for the making of the improved spring can be reduced to a fraction of the quantity of material which is needed to construct a conventional diaphragm spring capable of storing the same quantity of energy. More specifically, it is possible to reduce the thickness of the improved diaphragm spring 1 to a fraction of the thickness of a conventional diaphragm spring wherein the rim stores the same quantity of energy as the rim 2 plus the inner marginal portion 2a of the improved spring.

Figure 2:
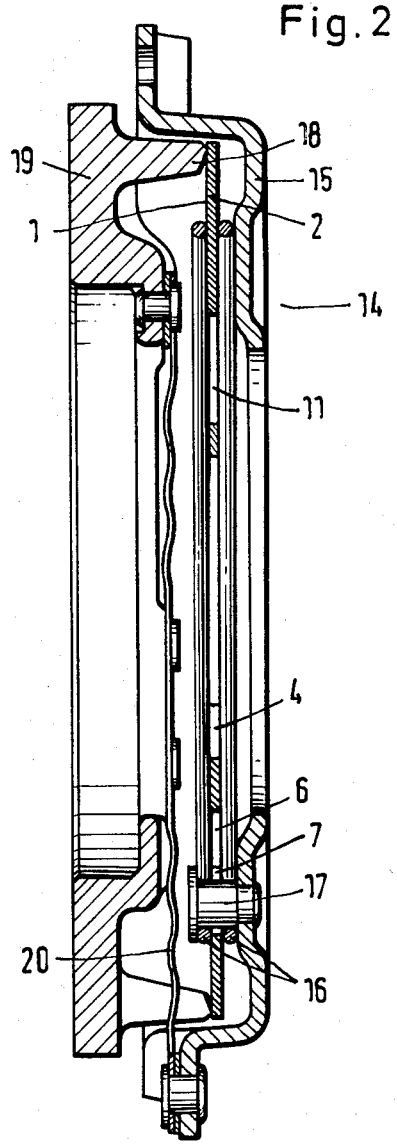
FIG. 2 is a somewhat schematic axial sectional view of a friction clutch which utilizes the diaphragm spring of FIG. 1.

FIG. 2 illustrates a friction clutch 14 which can be used in an automotive vehicle or for many other purposes and embodies the diaphragm spring 1 of FIG. 1. The spring 1 is interposed between a cover 15 and a pressure plate 19 of the clutch 14 in such a way that its rim 2 engages the axially extending projections 18 of the pressure plate. The innermost portion of the rim 2 can pivot between two ring-shaped seats 16 one of which is adjacent to or forms part of the inner side of the cover 15 and the other of which is held against the left-hand side of the rim 2 by a set of rivets 17 whose shanks extend through the enlarged portions 7 of outer slots 5. It normally suffices to provide a relatively small number of rivets 17, e.g., the number of rivets can be half the number of slots 5. The reference character 20 denotes in FIG. 2 one of several leaf springs which serve to transmit torque between the cover 15 and the pressure plate 19.

The rivets 17 center the diaphragm spring 1 between the pressure plate 19 and the cover 15 of the clutch 14.

The clutch 14 of FIG. 2 is shown in engaged condition, i.e., the rim 2 of the diaphragm spring 1 bears against the projections 18 of the pressure plate 19, and the spring 1 is practically or entirely flat. In other words, the rim 2 is coplanar with the prongs 3 of the spring 1. In order to disengage the clutch 14, a suitable disengaging bearing (not shown) is caused to move in a direction to the left, as viewed in FIG. 2, and to press against the tips 12 of the prongs 3 whereby the spring 1 pivots between the seats 16 and moves its rim 2 in a direction to the right so as to relax or terminate the pressure upon the projections 18. This enables the pressure plate 19 to release a customary clutch disc (not shown) which is interposed between the left-hand side of the pressure plate 19 and a torque transmitting element, e.g., a flywheel on the crankshaft of the engine in an automotive vehicle.

It is clear that the improved diaphragm spring can be used with equal or similar advantage in many other types of clutches, e.g., in clutches wherein the prongs 3 must be pulled (rather than pushed) in order to disengage the clutch. Furthermore, the spring 1 can be used in so-called twin clutches of the type often used in automotive vehicles or for other purposes.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A diaphragm spring having a substantially centrally located opening and comprising an annular outer marginal portion and a plurality of prongs disposed inwardly of said marginal portion and extending toward said opening, said spring further having elongated first slots disposed between said prongs and elongated second slots extending toward said opening and disposed between said first slots and said marginal portion and having enlarged portions in the region of said marginal portion, said first slots being spaced apart from said second slots, as considered in the radial direction of said marginal portion, and said spring further having cutouts disposed radially inwardly of said marginal portion and overlying portions of said first and second slots, as considered in the radial direction of said marginal portion, and being spaced apart from said opening.

2. The spring of claim 1, wherein said prongs have free end portions surrounding said opening and said first slots communicate with said opening.

3. The spring of claim 1, wherein said slots extend substantially radially of said marginal portion.

4. The spring of claim 1, wherein each of said first slots is at least substantially aligned with a different one of said second slots.

5. The spring of claim 1, wherein said first and second slots are at least substantially equidistant from one another, as considered in the circumferential direction of said marginal portion.

6. The spring of claim 5, wherein said cutouts are at least substantially equidistant from one another, as considered in the circumferential direction of said marginal portion, and alternate with said first and second slots.

7. The spring of claim 1, wherein the length of said cutouts exceeds the length of said first slots.

8. The spring of claim 1, wherein the length of said second slots exceeds the length of said first slots.

9. The spring of claim 1, further comprising an annular inner marginal portion surrounding said opening and surrounded by said outer marginal portion, said slots and said cutouts being provided in said inner marginal portion and the width of said inner marginal portion, as considered in the radial direction of said marginal portions, exceeding the width of said outer marginal portion.

10. A diaphragm spring having a substantially centrally located opening and comprising an annular outer marginal portion and a plurality of prongs disposed inwardly of said marginal portion and extending toward said opening, said spring further having elongated first slots disposed between said prongs and elongated second slots extending toward said opening and disposed between said first slots and said marginal portion and having enlarged portions in the region of said marginal portion, said first slots being spaced apart from said second slots, as considered in the radial direction of said marginal portion, and said spring further having cutouts extending substantially radially of said marginal portion and overlying portions of said first and second slots, as considered in the radial direction of said marginal portion, and being spaced apart from said opening.

* * * * *